Jan. 19, 1943.  W. F. FELL  2,309,054
CIRCUIT BREAKER FOR STORAGE BATTERY SYSTEM OR THE LIKE
Filed Nov. 2, 1939
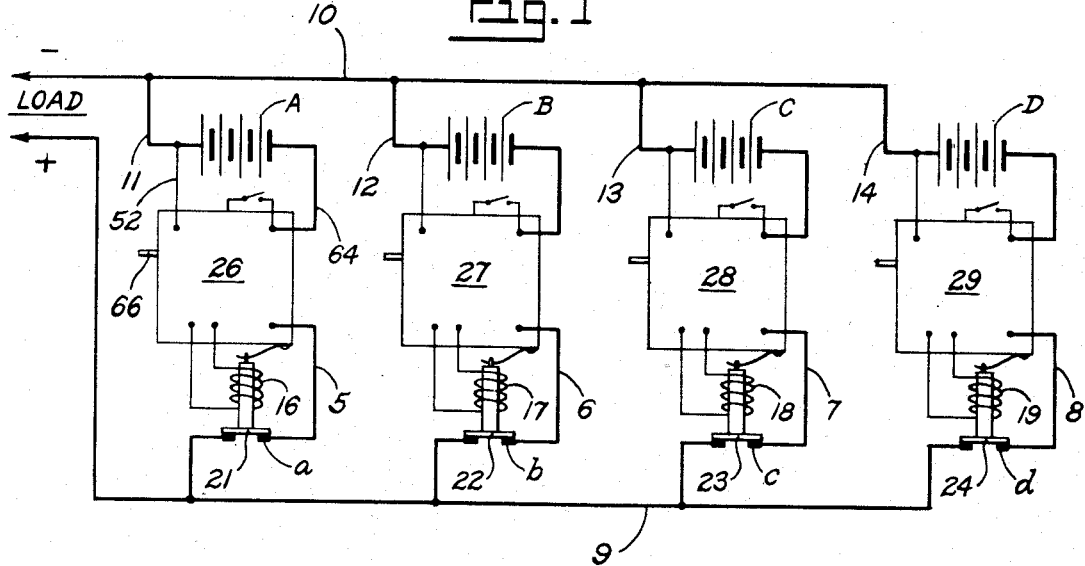
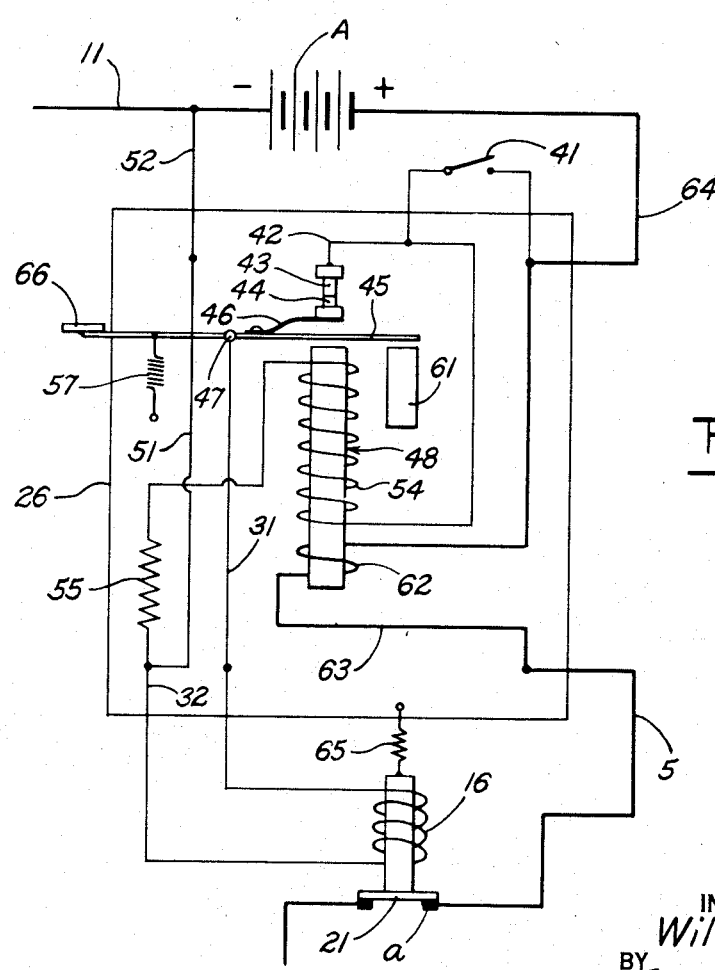
INVENTOR.
William F. Fell
BY Martin J. Finnegan
ATTORNEY.

Patented Jan. 19, 1943

2,309,054

UNITED STATES PATENT OFFICE 2,309,054

CIRCUIT BREAKER FOR STORAGE BATTERY SYSTEM OR THE LIKE

William F. Fell, Trenton, N. J., assignor to Bendix Aviation Corporation, South Bend, Ind., a corporation of Delaware Application November 2, 1939, Serial No. 302,622

2 Claims. (Cl. 171—314)

This invention relates to circuit breakers, and particularly to circuit breakers for controlling the action of the circuits in a multiple storage battery system, such as is installed in a multiple-motored aircraft.

Heretofore, in such multiple battery installations on aircraft, upon failure of any battery to function normally there developed a tendency for all battery circuits to feed into the defective battery, which tendency frequently resulted in the complete discharge of all batteries, thus de-energizing the entire battery system and rendering the electrical equipment inoperative. An object of the present invention is to preclude such an occurrence by a use of means functioning to automatically prevent one battery circuit discharging into another, by breaking the circuit involved whenever there is excessive current flow—not in either direction, however, as would be the case if an ordinary (load responsive) circuit breaker were employed—but only in the event that the excessive current flow is in the direction leading to the deranged battery. Thus the use of the battery as a source of heavy current discharge for brief intervals, as in energization of engine starting motors, is not interfered with; in other words, the battery circuit is made subject to uni-directional control only, and continues to permit current to be taken from the battery in any desired amount, but prevents current from being delivered thereto in an amount so great as to indicate a short-circuiting of cells therein, or some other derangement thereof.

Other features and advantages of the invention reside in the specific arrangement and relationships of elements as indicated in the following specification, to which the accompanying drawing is an ancillary part; it being understood, however, that the drawing is for the purpose of illustration only, and is not designed as a definition of the limits of the invention, reference being had to the appended claims for this purpose.

In the drawing:

Fig. 1 is a schematic illustration of an installation involving four batteries coupled to a common load, and indicating the method of applying the invention thereto; and Fig. 2 is a diagram of the operating connections associated with a representative one of the four batteries of Fig. 1.

Referring first to Fig. 1, there is indicated diagrammatically therein an electrical system having four batteries A, B, C, and D, and associated normally closed sets of contacts a, b, c, and d, respectively, located in the tap lines 5, 6, 7 and 8 serving to connect the several batteries with the positive side 9 of the main line to the electrical units such as the starting motors, generators, lights and other equipment that may be employed on aircraft, or equivalent installations wherein an interchange of electrical energy occurs as between storage batteries and other electrical units adapted to alternately or simultaneously consume and generate current. The negative side of the line is indicated at 10, and to this negative side 10 are connected the negative tap lines 11, 12, 13 and 14 leading to the negative terminals of the batteries A, B, C, and D, respectively.

The novel means whereby current flow in any one of the positive tap lines 5, 6, 7 and 8 is interrupted in the event of short circuiting or other derangement of one or more cells of the respective batteries associated therewith, is shown as involving a corresponding plurality of electromagnets 16, 17, 18 and 19 having armatures in the form of contact bridging elements as indicated at 21, 22, 23 and 24 in Fig. 1, the said bridging elements being normally in engagement with the corresponding sets of contacts a, b, c, and d, respectively; also as involving the electrical operating connections for energization of the electromagnets, said connections being preferably disposed within the several boxes or equivalent receptacles indicated at 26, 27, 28 and 29, respectively, in Fig. 1; and the internal connections of one of the boxes—which may be taken as representative of all—being shown in full in Fig. 2. As shown in Fig. 2 the connections for box 26 include a pair of conductors 31 and 32 for energization of the winding of electromagnet 16, the conductor 31 being in connection with the positive side of the battery A by way of intermediate connections including a manual operable switch 41, a lead 42 to a stationary contact 43, a movable contact 44 engageable with the contact 43 in response to movement of the armature 45 of an electromagnet 46 having a cooperating magnetic element or pole piece, the electrical circuit to conductor 31 being completed from said contact 44 by way of the metallic spring 46 carrying said contact 44 at its free or cantilever end and connecting electrically with terminal post 47 on the armature 45 at the pivot post, or fulcrum, thereof. The opposite lead 32 of the winding of the electromagnet 16 connects with the negative side of the battery A by way of conductors indicated at 51 and 52, the former being preferably an internal connection to the box 26 and the latter an external connection as indicated in Figs. 1 and 2.

In shunt with the circuit just traced is a second circuit including the winding 54 of the electromagnet 48 and also preferably including a resistor 55 to facilitate maintenance of a constant magnetic effect. A second factor controlling the effect of the winding 54 upon the armature 45 is indicated at 57, as taking the form of a tension spring fixed at one end and having its opposite end secured near the outer end of the armature 45 on the side thereof opposite its fulcrum 47. Associated with the opposite end of the armature 45 is a bar 61 of permanently magnetic material, hence tending to hold the armature 45 in the lower position following a descent, or clockwise swinging, thereof. Also tending to move the armature to its upper or lower position (depending on the direction of current flow) is the magnetic field produced by the flow of current through the single turn 62 of the conductor 63 which joins the positive tap line 5 with the positive terminal of the battery A, in conjunction with the external connection therefrom which is indicated at 64.

Having thus described the parts entering into the preferred embodiment of the invention as illustrated in the accompanying drawing the operation thereof will now be described. Under normal conditions—that is, with all or some of the batteries A, B, C, and D floating across the line 9, 10 and receiving a normal charge of current from the generating means (not shown), located in said line—the magnetic fields set up by the current passing through both the shunt winding 54 and the series winding 62 are cumulative, both tending to draw the armature 45 downwardly and thus to separate the contacts 43 and 44; but until this charging current passes the maximum as determined by the adjustment of spring 57, the latter remains effective to hold the contact 44 in engagement with the contact 43 and thus maintain energization of the electromagnet 16 and hence a closed circuit through the battery feeding line 5 by reason of the bridging of contacts a. When such maximum is exceeded, as for example by reason of a short circuiting of one or more cells of the battery A (and hence a tendency for more current to flow thereto from the line 9, 10), the magnetic pull upon the armature 45 becomes sufficient to separate the contacts 44 and 43 and thereby interrupt the supply of current to the electromagnet 16. The resultant opening of the circuit to the battery A as the contact a (the effect of spring 65 upon the electromagnet 16 being such that the element 21 moves to the non-bridging position upon cessation of current flow) produces an interruption of the action of feeding current to the battery A. Meanwhile, the armature 45, having thus moved downwardly, remains down due to the magnetic hold established by the permanent magnet 61 thereupon, which hold is broken only upon manual resetting of the armature by the means indicated at 66. Should such resetting occur without a correction of the abnormal condition within the battery A the action of reopening the circuit thereto will of course be repeated as above described.

While the means above described operates to break the circuit at the switch a upon the passage of excessive current in the direction leading to the battery A, the action is not the same in the event that a corresponding or even greater current flow occurs in the opposite direction—as it may do, for example, during operation of a starting motor connected across the lines 9, 10 and drawing current from the battery by way of such tap line 5. This is due to the fact that the action of the magnetic field of the winding 62 would be reverse in the event of current flow from the battery and hence said magnetic field will oppose the field created by the winding 54 and as a result of such opposition the spring 57 receives sufficient assistance to maintain the contacts 43 and 44 in engagement thus maintaining the electromagnet 16 energized and establishing continuity in the current flow in the line 5. In this respect the circuit controller 16 and the parts associated therewith differ in their arrangement and mode of operation from that of a conventional, excessive load-responsive, circuit breaker, for the latter would open the circuit controlled thereby in response to excessive current flow in either direction; moreover, in some cases such devices permit current flow in only one direction, and therefore are not applicable to a two-direction system such as is involved here.

What I claim is:

1. In a multiple electric storage battery system, the combination with a single main feed line, of tap lines from said main feed line to each battery of the system, a normally closed switch in each tap line, means responsive to an excessive surge of current, but only when directed toward one of said batteries, to open the corresponding normally closed switch while the others remain closed, said means comprising a second switch member movable to and from a circuit closing position, an electromagnet in circuit with said switch and operable to hold said first-named switch normally closed so long as said second switch remains closed, and electromagnetic means for opening said second switch, said electromagnetic means including a core having a pair of windings, one forming part of the path of current to the battery, and wound so that the magnetic fields of the two windings are of opposite effect whenever current flows from the battery to said winding, and therefore are ineffective to open said second switch so long as such condition prevails, but operate to open said second switch when the current flow is toward the battery, and in an amount which renders the cumulative magnetic effect of both windings sufficient to produce such switch opening movement.

2. Means for protecting a pair of electric storage batteries, feeding a common load, against excessive current flow from one to the other, said means comprising a pair of switches, one in series with each of said batteries and both in circuit with said load, means for holding each of said switches in closed position regardless of the strength of the current being discharged by the associated battery, and means for opening each of said switches in response to excessive current flow in the direction toward the associated battery.

WILLIAM F. FELL.